A. D. TEARE.
VEHICLE WHEEL.
APPLICATION FILED MAR. 27, 1917.
1,244,002.
Patented Oct. 23, 1917.
3 SHEETS—SHEET 1.
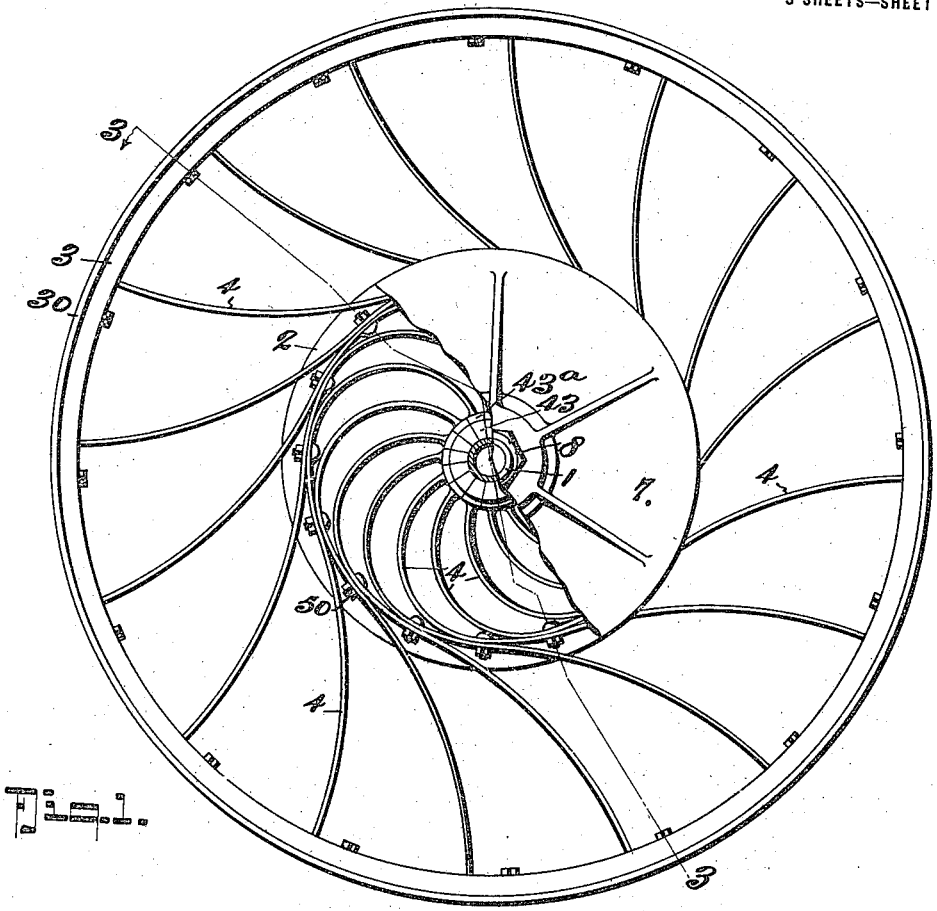
INVENTOR
Archie D. Teare.
BY
ATTORNEY

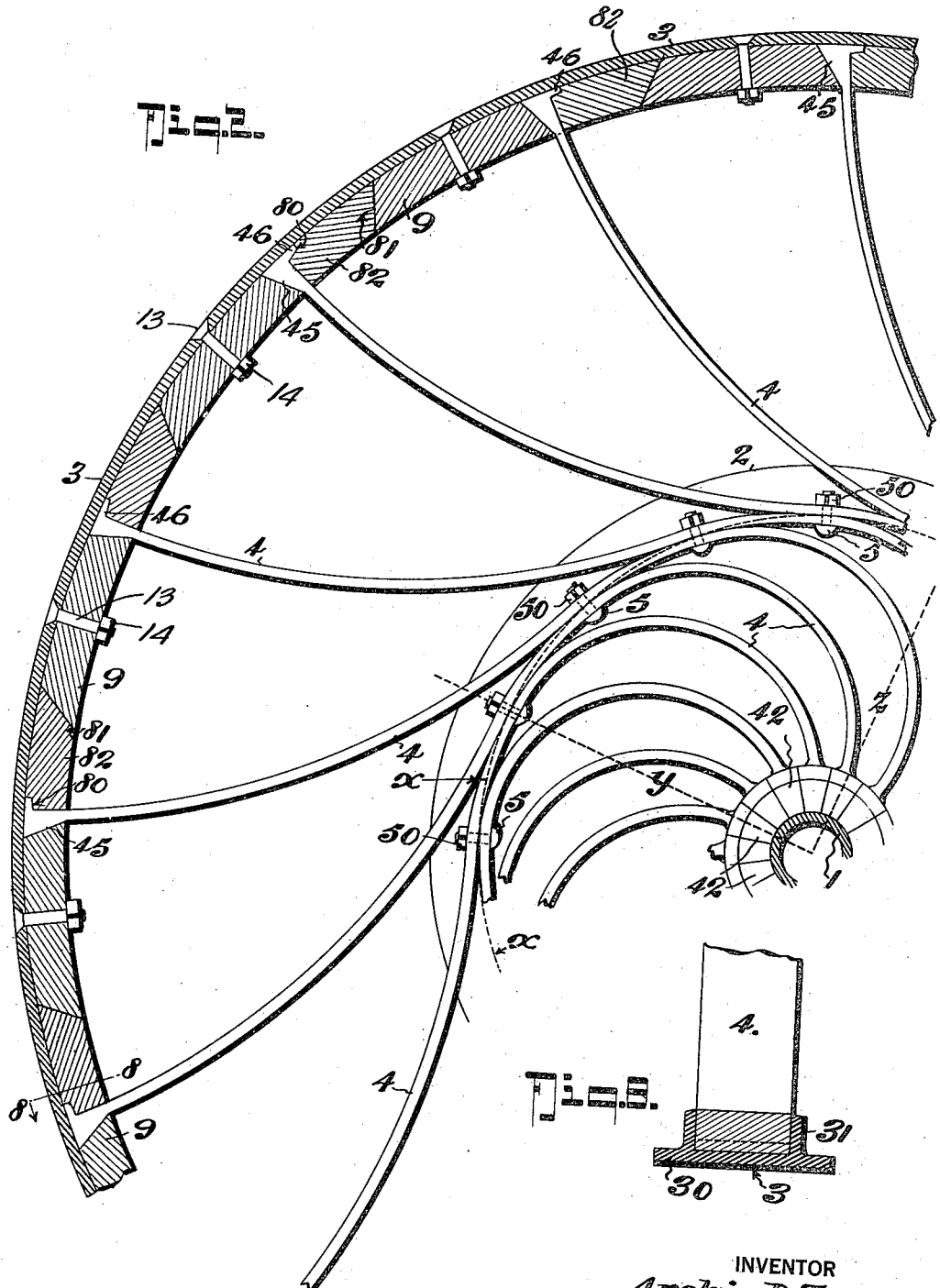

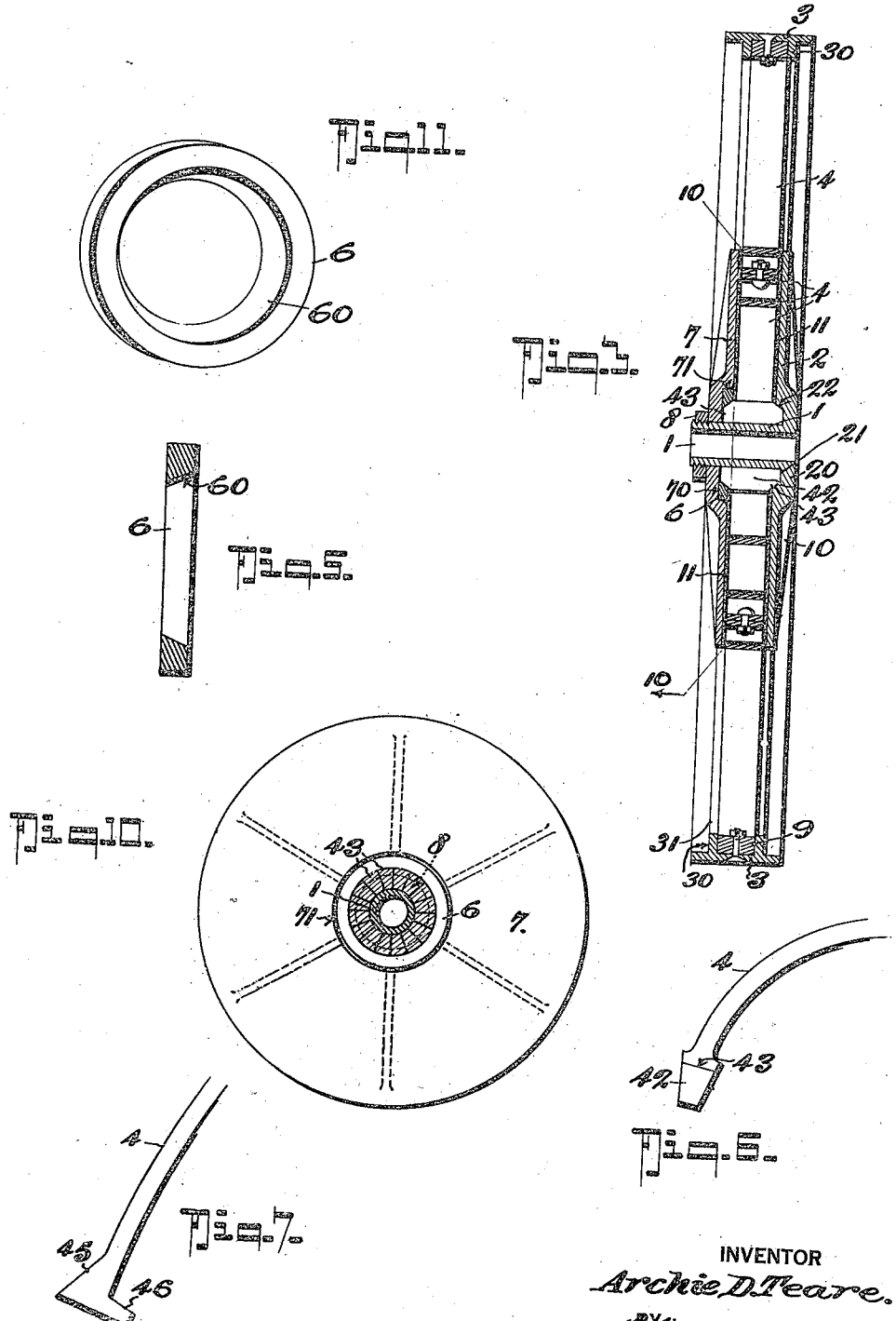

UNITED STATES PATENT OFFICE.

ARCHIE D. TEARE, OF VICTOR, SOUTH DAKOTA.

VEHICLE-WHEEL.

1,244,002.  Specification of Letters Patent.  Patented Oct. 23, 1917.

Application filed March 27, 1917.  Serial No. 157,792.

*To all whom it may concern:*

Be it known that I, ARCHIE D. TEARE, residing at Victor, in the county of Roberts and State of South Dakota, have invented a new and Improved Vehicle-Wheel, of which the following is a specification.

This invention relates to improvements in that class of vehicle wheels known as spring wheels in which the spokes are usually in the nature of curved spring leaves or members whose inner ends are connected with the hub and whose outer ends are likewise connected to the rim or felly, and the connection between the spoke and the hub and felly or rim, especially designed for cushioning the wheel travel and to permit movement of the hub for taking up the vibrations due to traveling over rough places.

My invention primarily seeks to provide a wheel of the general type stated, of a simple and comparatively inexpensive character, in which the spokes are particularly adapted for connecting with a rim which may be flat for receiving a solid cushion or otherwise shaped for the use of a pneumatic tire under desirable conditions.

My invention further seeks to provide a wheel of the type stated, in which certain improved elements are included for causing the desired expansion of the spring members without tendency of the hub to twist in either way, whereby to provide for maintaining a substantial rigid hub, yet yielding to pressure toward the rim in any direction and at the same time hold down any tendency of the wheel to dish.

In its more subordinate features, my invention embodies, among other purposes a simple and easily adjusted means for securing the resilient spokes to the rim and for assembling and securing them around the wheel hub without the need of bolts or stud pin connections, such as are generally employed in kindred wheel structures.

With the above and other objects in view, that will presently appear, my invention is an improved spring wheel that embodies the peculiar features of construction and novel combination of parts to be first described in detail, specifically pointed out in the appended claims and illustrated in the accompanying drawings, in which:

Figure 1 is an elevational view of a spring wheel constructed in accordance with my invention, one-half of one of the reinforced disk or plate members being omitted, to more clearly illustrate the manner in which the hub end of the spring spokes are nested around the hub.

Fig. 2 is a fragmental side elevation that illustrates a number of the spokes assembled in operative position, the hub and the rim portion and the clamp block that coöperates with the outer end of the spokes and the rim being shown in section.

Fig. 3 is a transverse section of the wheel taken substantially on the line 3—3 on Fig. 1.

Fig. 4 is a detail view of the hub equipped clamping disk or plate.

Fig. 5 is a detail sectional view of the clamping or wedge ring that coöperates with the reinforced disk or plate that opposes the hub equipped clamping plate.

Fig. 6 is a detail side view of the hub engaging end of one of the resilient spokes.

Fig. 7 is a similar view of the rim engaging end of one of the said spokes, and

Fig. 8 is a detail cross section taken on the line 8—8 on Fig. 2.

Fig. 9 is a detail perspective view of one of the spoke members.

Fig. 10 is a detail section on the line 10—10 on Fig. 3.

Fig. 11 is a perspective of the ring shown in Fig. 5.

In carrying out my invention, I preferably form the wheel hub 1 as an integral part of a reinforced side plate or disk 2 in the nature of a solid member having a central off-set portion 20 that constitutes an annular socket 21 which surrounds one end of the hub and whose peripheral edge 22 is beveled, as is best shown in Fig. 3, which also shows the reinforcing or radial ribs 10.

3 designates the wheel rim, which, as shown, includes a flat metal felly 30 whose outer or tread face is left plain in order that any form of tire, either solid or pneumatic, may be applied.

While my invention is primarily intended to do away with the necessity of a pneumatic tire, yet, I prefer to leave the tread face of the felly of such shape that any type of tire may be applied thereto.

The rim in my construction includes a pair of inwardly projecting flanges 31 between which the outer ends of the spring spokes are assembled and secured in the manner to be presently fully explained.

The resilient spokes 4, in my construction of wheel, are of the ogee curved type, the curvature of each spoke being such, however, that the complete set of spokes contact with each other in a circle concentric with the hub, as indicated by the broken circle line $x$ on Fig. 2, and the several spokes along their points of contact are secured by removable bolts and nuts 5—50, as is best shown in Figs. 1, 2 and 3.

By referring more particularly to Fig. 2, it will be seen that by reason of the curvature of the spokes, each of the spokes has its hub end so shaped that its point of contact with the hub is in a plane substantially at right angles to the point where the spoke bears against and is secured to an adjacent spoke, as indicated by the broken lines $y$ and $z$ on Fig. 2.

By reinforcing the spokes by connecting them along the circular path indicated, each spoke is fastened to a pair of adjacent spokes, and while the reinforced connection of the spokes as a whole is along the circular path stated, each spoke has two distinct points of reinforcing with the other spokes.

At the hub end, each spoke is formed with a wedge shaped abutment portion 42 and the abutments on the complete set of spokes are of such relative size that when assembled they constitute a substantial solid ringlike bearing for fitting on the hub, and to provide for conveniently and positively holding the said hub ends of the spokes secure upon the hub without the need of bolts or other like means for fixedly holding each separate spoke, each spoke at the hub end has lateral extensions that constitute interlocking members 43, the outer edges 43$^a$ of which are beveled, as is best shown in Fig. 3, by reference to which it will be also seen that the member 43 at one side of the spokes projects into the socket 21 on the inner face of the clamp disk 2, that is integral with one end of the hub 1 and the members 43$^a$ at the other side of the spokes are engaged by a clamp ring 6 having a beveled bearing 60 for effecting a tight engagement with the said spoke members 43$^a$, as shown.

To secure the several hub engaging members in operative relation, a clamping disk or plate 7 is provided, which is shaped similar to the opposing clamping disk 2, excepting that the annular edge 71 of the axial groove 70 is cylindrical for fitting onto the outer peripheral surface of the clamping ring 6.

The spoke connections at the hub are held to their coöperative adjustment by a clamp nut 8 that engages the externally threaded end of the hub 1, as shown.

Each clamping plate or disk has a fiber lining as indicated by 11 and the disks are of such diameter that, when applied, they cover all of the spokes to a point beyond the fastening bolts and nuts 5—50 and since they cover the bearings and the interlocked connections of the spring spokes, as stated, tendency of the wheel to dish is prevented and rigidity is applied to the wheel where it is most needed.

The rim end of each spoke is thickened and has one side 45 beveled and the other side formed with an angle or toe member 46 and the said rim ends which fit between the opposite flanges of the rim, are securely held in place by means including solid (preferably wooden) blocks 82 undercut as at 80, to fit over the spoke toe members 46 and beveled at the other end as at 81 for coöperating with a wedge block 9 whose opposite beveled edges, when the said block is forced in place, engage the beveled end 81 of an adjacent solid block 82 and the tapered heel portion 45 of an adjacent spoke.

Each wedge block is secured to the rim by a bolt 13 that passes through said rim and is secured by a clamp nut 14.

From the foregoing description taken in connection with the drawing, the complete construction, the manner in which the parts are assembled and the advantages of my invention will be readily apparent to those skilled in the art to which my said invention relates.

In my wheel construction, by connecting all the spring spokes with each other in the manner shown and described, while each spring is independently resilient with respect to the others and the hub and the rim, the complete set of spokes, constitute, as it were, a single resilient connection between the hub and the rim and the advantage of each is apparent, since there is at all times a distribution of the strain throughout the entire wheel structure rather than at any particular point thereof, where each spoke is as a separate resilient connection between the rim and the hub.

By joining the hub ends of the spokes in the manner stated, the use of tie bolts, such as are usually required in spring wheel structures (which tend to weaken the wheel at the hub) are avoided and since the contact of the hub ends of the spokes is in a direction at substantially right angles to the point of connection of one spoke with an adjacent spoke, the strain on the wheel tends to force the said hub ends radially toward the hub and thereby overcomes creeping of the spokes along the hub.

Another advantageous feature in my construction of wheel is the simple and expeditious way in which a broken spoke may be taken out and a new one replaced.

In case of breakage, all that is necessary is to unscrew the nut on the hub end, take off the removable disk plate 7 and the clamp ring 6 at the hub end, take out the clamp bolt at the rim and the coincident wedge block and loosen up the bolt and the nut connections that join the broken spoke to the adjacent spokes, when the broken spoke can be slid sidewise at the hub end and pulled out at the rim end.

It is obvious that a new spoke may then be easily fitted in place of the other without disturbing the adjustment of the remaining spokes.

While I have described in detail a practical and preferred means for securing the hub end of the spokes around the hub, without the usual bolt connections, and a preferred means of clamping the rim ends of the spokes in operative position, I desire it understood that I do not limit myself to the exact means for securing the hub and the rim ends of the spokes, since various modifications of such means may be employed and yet come within the scope of the appended claims.

What I claim is:

1. A wheel comprising a hub, a rim, and a series of substantially ogee curved spokes, each spoke being joined to an adjacent spoke, the hub ends of all of the spokes having such circular abutment relation whereby each spoke seats on the hub in a direction at approximately right angles to their points of connection with each other, and means for fixedly holding the outer ends of the spokes in fixed relation on the rim.

2. A wheel comprising a hub, a rim and a series of spring spokes of a substantially ogee shape, each spoke being fixedly connected with an adjacent spoke, the points of connection of the series of spokes being concentric with the hub and means for securing the spokes to the hub, and other means for securing the said spokes to the rim.

3. A wheel comprising a hub, a rim, and a series of spring spokes of substantially ogee shape, each spoke being fixedly connected to the adjacent spokes at both sides thereof, the line of connection of all the spokes being concentric with the hub and means for securing the spokes to the hub and other means for securing the spokes to the rim.

4. A wheel comprising a hub, a rim, and a series of spring spokes of substantially ogee shape, each spoke being fixedly connected to the adjacent spokes at both sides thereof, the line of connection of all the spokes being concentric with the hub, opposing clamp disks attached to the hub for engaging the hub ends of the spokes, said disks of a diameter to extend over the line of the spoke connections, and means for securing the outer ends of the spokes to the wheel rim.

5. A wheel comprising a hub, a rim, and a series of spring spokes of substantially ogee shape, the hub ends of which terminate in tapered abutting members adapted to fit ring shape onto the periphery of the hub, a bolt and nut connection that joins each spoke with an adjacent spoke, the line of said connections being in a plane substantially at right angles to the abutting contacts of the spokes with the hub, means mounted on the hub for holding the hub ends of the spokes in substantially rigid relation and other means for securing the spokes to and holding their outer ends spaced on the rim.

6. The combination with a hub and a rim; of a series of curved resilient spokes connecting the hub and the rim, the hub engaging ends of the said spokes having tapered abutments that form a substantial solid ring when assembled around the hub, each of the said hub engaging ends including lateral extensions having tapered outer edges, a clamp disk fixedly attached to one end of the hub and having an annular socket for receiving the spoke extensions at that side, the socket including a beveled edge for clamping on the beveled edge of the spoke extensions engaged thereby, a wedge ring for engaging the beveled edges of the other spoke extensions, a disk plate mounted on the hub that engages the spokes and the clamp ring and opposes the other clamping disk and means for securing the said disk plate onto the hub.

ARCHIE D. TEARE.

Copies of this patent may be obtained for five cents each, by addressing the "Commissioner of Patents, Washington, D. C."